United States Patent [19]

Hicks et al.

[11] 4,125,284
[45] Nov. 14, 1978

[54] VEHICLE WITH CONVERTIBLE STEP AND FOOT REST

[75] Inventors: John E. Hicks; Ronald M. Stolley, both of Lincoln, Nebr.

[73] Assignee: Outboard Marine Corporation, Waukegan, Ill.

[21] Appl. No.: 772,530

[22] Filed: Feb. 28, 1977

[51] Int. Cl.² ............................................. B62D 33/02
[52] U.S. Cl. .................. 296/62; 280/164 R; 296/69; 297/429
[58] Field of Search ..................... 296/66, 69, 62, 58; 280/166, 16 AR, DIG. 5; 5/332; 297/429, 431

[56] References Cited

U.S. PATENT DOCUMENTS

| | | | |
|---|---|---|---|
| 1,223,639 | 4/1917 | Swartsel | 296/62 |
| 1,740,772 | 12/1929 | Kuhlman | 296/56 |
| 2,516,237 | 7/1950 | Morse | 296/58 |
| 2,991,118 | 7/1961 | Sleger | 280/166 |
| 3,833,240 | 9/1974 | Weiler | 280/166 |

FOREIGN PATENT DOCUMENTS 530,289  7/1955  Italy ......................................... 280/166

*Primary Examiner*—Joseph F. Peters, Jr.
*Assistant Examiner*—John A. Carroll
*Attorney, Agent, or Firm*—Michael, Best & Friedrich

[57] ABSTRACT

Disclosed herein is a self-propelled vehicle for transporting personnel and/or small cargoes including a seat for the driver and a cargo-carrying bed or floor located rearwardly of the seat. The floor includes a stationary, generally flat first platform and a movable section including a generally flat second platform and a rear wall member extending generally perpendicular to the second platform. The movable floor section is supported from the rear portion of the vehicle frame for selective pivotal movement between a raised or cargo-carrying position where the second platform is generally coplanar with the first platform and the rear wall member serves to confine cargo on the floor and a lowered or passenger-carrying position where the rear wall member can serve as a step for a passenger to step up and sit on the stationary platform and also serve as a foot rest for a rearward-facing passenger(s) sitting on the stationary platform. The movable floor section is releasably held in the raised position by a pair of laterally spaced arms, each of which, at the outer end, is pivotally supported from the movable floor section and, at the inner end, is provided with a detent notch which is biased into releasable engagement with a pin located on the vehicle frame beneath the stationary platform by a spring connected between the inner end of the arm and the vehicle frame.

8 Claims, 3 Drawing Figures

VEHICLE WITH CONVERTIBLE STEP AND FOOT REST

BACKGROUND OF THE INVENTION

This invention relates to self-propelled vehicles of the type used for transporting personnel and/or small cargoes within and between buildings of an industrial facility.

Self-propelled vehicles similar to golf carts are used in industrial facilities and the like for transporting personnel between different locations within one building and from one building to another. Such vehicles usually have a seat for only the driver and one passenger and a relatively small platform behind the seat on which small cargoes can be carried. Vehicles of this type commonly are provided with accessory equipment to facilitate transportion of additional passengers or larger cargoes. For instance, such accessory equipment typically includes one or more auxiliary seats which can be temporarily mounted on the cargo platform for accommodating an additional passenger(s) and a step and foot rest assembly which can be temporarily mounted on the rear of the vehicle to facilitate passenger boarding and serve as a foot rest for the additional passenger(s). Also, a pickup box which can be temporarily mounted on the vehicle to enlarge the cargo-carrying space is often included as part of the accessory equipment.

In addition to the necessity of providing a storage area for this accessory equipment, considerable time and effort is required to install and/or remove the appropriate accessory equipment, particularly the step and foot rest assembly and the pickup box, when the vehicle is to be converted from use as a personnel carrier to a cargo carrier and vice versa.

SUMMARY OF THE INVENTION

The invention provides a vehicle having a cargocarrying portion including a stationary platform and a movable floor section which is mounted for pivotal movement relative to the stationary platform between a raised position where it can carry cargo and a lowered position where it can serve as a step and foot rest for passengers.

More specifically, the invention provides a vehicle including a vehicle frame having a rear stationary, generally flat first platform, and a movable floor section including a generally flat second platform and a wall member extending generally perpendicular to the second platform. The movable floor section is supported from the vehicle frame for pivotal movement relative to the first platform between a raised or cargo-carrying position wherein the first and second platforms are generally coplanar and the wall member is spaced rearwardly from the first platform and a lowered or passenger-carrying position wherein the second platform extends downwardly and generally perpendicular to the first platform and wherein the wall member can serve as a step for one to step up and sit on the stationary platform and as a foot rest for a rearward-facing passenger riding on the stationary platform. Means are provided on the movable floor section and on the vehicle frame for releasably supporting the movable floor section in the raised position.

In one embodiment, the movable floor section is releasably supported in the raised position by at least one arm which, at the outer end is pivotally mounted on the movable floor section and, at the inner end, is provided with a detent notch which is biased into releasable engagement with a laterally extending pin located beneath the stationary platform by a spring connected between the inner end of the arm and a location on the vehicle forwardly of the pin.

The movable floor section preferably is provided with panels which extend generally perpendicularly to the opposite sides of the second platform and to the opposite ends of the wall member. These panels cooperate with the wall member to confine cargo on the floor when the movable floor section is in the raised position and to provide side protection for a passenger's feet and legs when the movable floor section is in the lowered position.

A principal feature of the invention is the provision of a vehicle including a cargo-carrying bed or floor which is capable of being conveniently converted between a cargo-carrying mode and a passenger-carrying mode without the use of accessory equipment or additional tools.

Another principal feature of the invention is the provision of a vehicle including a stationary platform and a movable floor section which has a wall member and is selectively pivotally movable relative to the stationary platform between a raised position wherein the movable floor section can carry cargo and a lowered position wherein the wall member thereof can serve as a step for one to step up and sit on the stationary platform an can also serve as a foot rest for a rearward-facing passenger riding on the stationary platform.

Other features and advantages of the embodiments of the invention will become apparent to those skilled in the art upon reviewing the following detailed description, the drawing and the appended claims.

Figure 1:
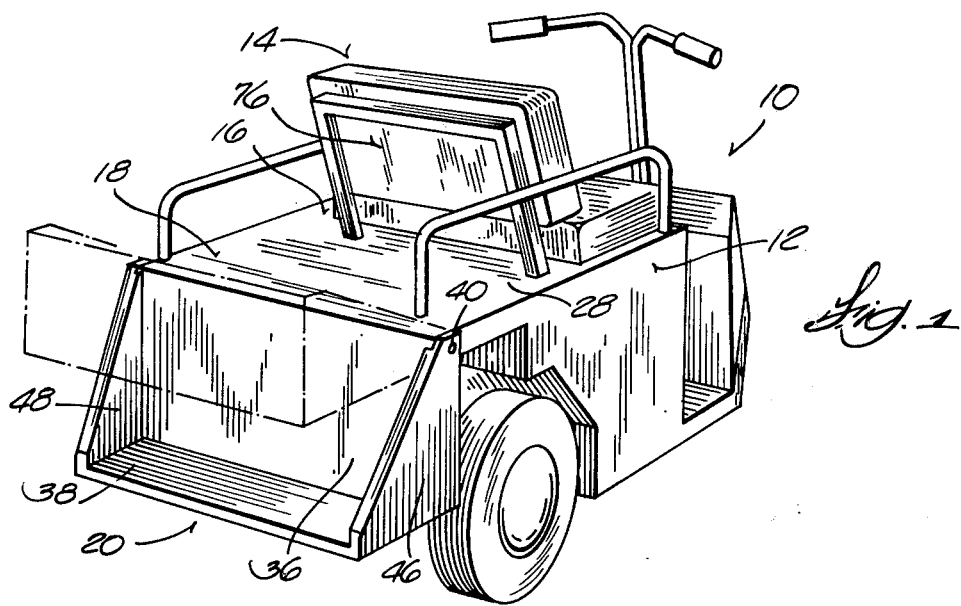
FIG. 1 is a perspective view of a self-propelled vehicle which embodies various of the features of the invention and which is shown with a movable floor section in a lowered position.

Before explaining at least one embodiment of the invention in detail, it is to be understood that the invention is not limited in its application to the details of construction and the arrangement of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Illustrated in the drawing is a self-propelled vehicle 10 for transporting personnel and/or small cargoes within and between buildings of an industrial facility. The vehicle 10 includes a frame 12 supporting a seat 14 for the operator and one passenger and a generally horizontally extending cargo-carrying bed or floor 16 supported from the vehicle frame 12 rearwardly of the seat 14. The floor 16 has a stationary section 18 and a movable section 20.

The stationary floor section 18 (see FIG. 2) includes a main frame 22 which has a pair of laterally spaced side members 24 (one shown) suitably supported from the vehicle frame 12 and a generally flat, horizontally extending, load-bearing or cargo-carrying, stationary platform 28 supported on the side members 24.

The movable floor section 20 includes a supplemental frame 30 which has a pair of laterally spaced side members 32 (one shown), a generally flat, load-bearing or cargo-carrying platform 36 supported on the side members 32, and a rear wall member 38 extending from the rear edge portion of and generally perpendicular to the platform 36.

Figure 2:
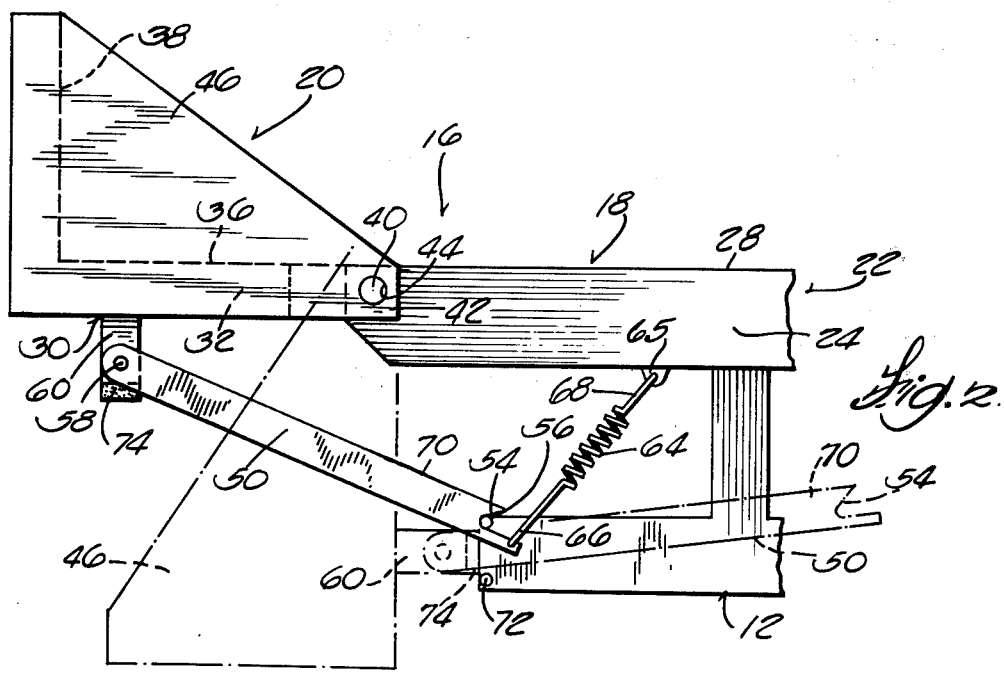
FIG. 2 is an enlarged, fragmentary side view of the rear portion of the vehicle shown in FIG. 1, wherein the location of certain components when the movable floor section is in the raised position and when the movable floor section is in the lowered position is respectively illustrated by solid lines an by dashed lines.
Figure 3:
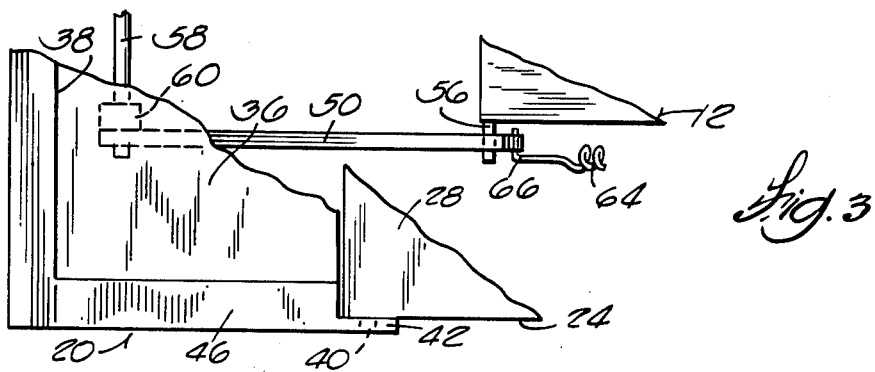
FIG. 3 is an enlarged, fragmentary top plan view of the rear portion of the vehicle shown in FIG. 1.

Means are provided for supporting the movable floor section 20 from the rear of the vehicle 10 for pivotal movement relative to the stationary floor section 18 between a raised or cargo-carrying position wherein the movable platform 36 is generally coplanar with the stationary platform 28, as shown by the dashed lines in FIG. 1 and the solid lines in FIG. 2, and a lowered or passenger-carrying position wherein the movable platform 36 extends downwardly from and generally perpendicularly to the stationary platform 28, as shown by the solid lines in FIG. 1 and the dashed lines in FIG. 2. When the movable floor section 20 is in the lowered position, the rear wall member 38 is located to serve as a step for a passenger to step up and sit on the stationary platform 28 and also as a foot rest for one or more passengers sitting on the rear portion of the stationary platform 28 and facing rearwardly.

While various arrangements can be used, in the specific construction illustrated, the pivotal mounting means for the movable floor section 20 includes a pin or stub shaft 40 affixed on and extending laterally outwardly from each of the side members 24 of the main frame 22 and a forwardly extending ear 42 on each of the side members 32 of the supplemental frame 30 and having an aperture 44 pivotally receiving a corresponding shaft 40.

The movable floor section 20 preferably is provided with vertical side panels 46 and 48 extending generally perpendicularly to and adjacent opposite side edges of both the movable platform 36 and the rear wall member 38. When the movable floor section is in the raised position, the side panels 46 and 48 cooperate with the rear wall member 38 to confine cargo being carried on the floor 16, particularly cargo located on the movable platform 36 of the movable floor section 20. When the movable floor section is in the lowered position, the side panels 46 and 48 provide side protection for the passenger's legs and feet. While the side panels 46 and 48 have a generally triangular shape in the specific construction illustrated, they can have various other shapes which provide the dual function of cargo confinement and passenger protection.

Means are provided on the movable frame section 20 and on the rear portion of the vehicle frame 12 for releasably supporting the movable floor section 20 in the raised position. While various arrangements can be used, in the specific construction illustrated, such means (see FIG. 2) includes a pair of laterally spaced arms 50 (one shown) located beneath the floor 16, each having an outer end pivotally mounted on the movable floor section 20 and an inner end provided with a detent notch 54 which is adapted to releasably engage a laterally extending shaft or pin 56 affixed on the vehicle frame 12 at a location below the stationary frame section 18. More specifically, the arms 50 are fixedly connected on the opposite ends of a rod 58 pivotally extending through a pair of laterally spaced brackets 60 (one shown) affixed on the underside of the movable platform 36 or to the side members 32 of the supplemental frame 30.

When the movable floor section 20 is in the raised position shown by the solid lines in FIG. 2, the detent notch 54 of the arm 50 is biased into releasable engagement with a corresponding pin 56 by a tension spring 64 having a lower end 66 pivotally connected to the inner end of the arm 50 and an upper end 68 pivotally connected to the rear portion of the vehicle at a location above and forwardly of the pin 56. In the specific construction illustrated, the upper ends 68 of the springs 64 are pivotally connected to respective brackets 65 (one shown) mounted beneath the stationary platform 28.

To lower the movable floor section 20, it is first raised slightly past the horizontal to disengage the support arm detent notches 54 from the pins 56. Each of the arms 50 is then manually pivoted downwardly relative to the respective pin 56 (i.e., pivoted clockwise as viewed in FIG. 2) to a released position where the upper edge 70 can slide under the pin 56 as the movable floor section 20 is subsequently lowered. Since the arms 50 are fixedly connected to the rod 58, pivotal movement of one of the arms results in a corresponding pivotal movement of the other arm. Located on the vehicle frame 12 below each of the detent pins 56 is a shaft or pin 72 which, in cooperation with the detent pin 56, serves to guide the arm 50 between the operative position shown by the solid lines in FIG. 2 and a stowed position shown by the dashed lines in FIG. 2.

After the arms 50 have been moved to the released position, the movable floor section 20 is dropped and pivots to the lowered position by its own weight with the arms 50 being guided to the stowed position by the detent pins 56 and the pins 72. In addition, the brackets 60 engage a rear portion of the vehicle frame 12 and thereby act as a stop for limiting pivotal movement of the movable floor section 20. A bumper 74, made from a relatively resilient, shock-absorbing material such as rubber, preferably is provided on the outermost end of each of the brackets 60. The movable floor section 20 is held in the lowered position by its own weight.

One or more rearward-facing passengers can sit on a seat located on the stationary platform 28 with his feet resting on the rear wall member 38. Passenger seating can be provided by the use of one or more auxiliary seat cushions (not shown) temporarily secured on the stationary platform 28 or, preferably, by arranging the seat 14 so the backrest portion 76 thereof can be folded down to rest on the stationary platform 28.

To return the movable floor section 20 to the raised position when the vehicle 10 is to be used for hauling cargo, the movable floor section 20 is simply raised until the top edges 70 of the arms 50 ae moved past the detent pins 56, at which time the springs 64 urge the arms 50 upwardly to cause engagement of the detent notches 54 with the detent pins 56. Following release of the movable floor section 20, the springs 64 maintain the detent notches 54 of the arms 50 in releasable engagement with the detent pins 56.

Various of the features of the invention are set forth in the following claims:

What is claimed is:

1. A vehicle comprising a vehicle frame having a rear stationary, generally flat first platform, a movable floor section including a generally flat second platform, a wall member extending generally perpendicularly to said second platform, said second platform and said wall member having opposite side edge portions, and a pair of side panels respectively extending generally perpendicularly from said second platform and said wall member side edge portions, means supporting said movable floor section from said vehicle frame for pivotal movement of said movable floor section relative to said first platform between a raised position wherein said first and second platforms are generally coplanar and a lowered position wherein said second platform extends downwardly from and generally perpendicularly to said first platform, and means for releasably supporting said movable floor section in the raised position.

2. A vehicle according to claim 1 wherein said releasable support means comprises a laterally extending detent pin located below said first platform, at least one support arm having an outer end pivotally supported from said movable floor section and an inner end including a detent notch adapted to engage said detent pin when said movable floor section is in the raised position, and means for biasing said support arm detent notch into releasable engagement with said detent pin.

3. A vehicle according to claim 1 including a pair of laterally spaced main frame members supported from said vehicle frame and carrying said first platform, each of said main frame members having a rear portion, wherein said movable floor section includes a pair of laterally spaced supplemental frame members carrying said second platform and said wall member, each of said supplemental frame members including an ear extending forwardly from said second platform when said movable floor section is in the raised position, and wherein said pivotal support means for said movable floor section includes a shaft extending laterally outwardly from the rear portion of each of said main frame members and an aperture in each of said supplemental frame member ears pivotally receiving a respective one of said shafts.

4. A vehicle according to claim 2 wherein said biasing means comprises a tension spring having one end pivotally connected to said support arm inner end and the opposite end pivotally connected to said vehicle frame at a location forwardly and above said detent pin.

5. A vehicle according to claim 2 including means cooperating with said detent means for guiding said support arm between an operative position where it is located to support said movable floor section in the raised position and a stowed position where it is located beneath said first platform when said movable floor section is in the lowered position.

6. A vehicle comprising a vehicle frame having a rear portion, a stationary floor section including a pair of laterally spaced main frame members supported from said vehicle frame and carrying a generally flat, horizontally extending platform, a movable floor section including a pair of laterally spaced supplemental frame members carrying a generally flat second platform and a wall member extending generally perpendicularly to said second platform, means on said main frame members and on said supplemental frame members for supporting said movable floor section for pivotal movement relative to said stationary floor section between a raised position where said first and second platforms are generally coplanar and a lowered position where said second platform extends downwardly from and generally perpendicularly to said first platform and where said wall member can serve as a step for one to step up and sit on said first platform, a pair of laterally spaced, laterally extending detent pins located below said stationary floor section, a pair of laterally spaced support arms, each having an outer end pivotally supported from said movable floor section and an inner end including a detent notch adapted to engage a respective one of said detent pins when said movable floor section is in the raised position, and means for biasing each of said support arm detent notches into releasable engagement with a respective one of said detent pins.

7. A vehicle comprising a vehicle frame having a rear portion, a stationary floor section including a pair of laterally spaced main frame members supported from said vehicle frame and carrying a generally flat, horizontally extending platform, a movable floor section including a pair of laterally spaced supplemental frame members carrying a generally flat second platform, a wall member extending generally perpendicularly to said second platform, said second platform and said wall member having opposite side edge portions, and a pair of side panels respectively extending generally perpendicularly from said second platform and said wall member side edge portions, means on said main frame members and on said supplemental frame members supporting said movable floor section for pivotal movement relative to said stationary floor section between a raised position wherein said first and second platforms are generally coplanar and said side panels are adapted to cooperate with said second platform and said wall member to confine cargo on said second platform and a lowered position wherein said second platform extends downwardly from and generally perpendicularly to said first platform, and said side panels are adapted to provide side protection for the legs and feet of a rearward-facing passenger riding on said first platform, a pair of laterally spaced, laterally extending detent pins located below said stationary floor section, a pair of laterally spaced support arms, each having an outer end pivotally supported from said movable floor section and an inner end including a detent notch adapted to engage a respective one of said detent pins when said movable floor section is in the raised position, and means for biasing each of said support arm detent notches into releasable engagement with a respective one of said detent pins.

8. A vehicle according to claim 7 wherein said biasing means comprises a pair of tension springs, each having one end pivotally connected to the inner end of a respective one of said support arms and the opposite end pivotally connected to said vehicle frame at a location forwardly and above said detent pin.

* * * * *